(12) United States Patent
Murawski et al.

(10) Patent No.: US 8,612,032 B2
(45) Date of Patent: Dec. 17, 2013

(54) TERMINAL AND METHOD FOR EFFICIENT USE AND IDENTIFICATION OF PERIPHERALS HAVING AUDIO LINES

(75) Inventors: Mark David Murawski, Pittsburgh, PA (US); Ryan Anthony Zoschg, Pittsburgh, PA (US); James Randall Logan, Pittsburgh, PA (US); Roger Graham Byford, Apollo, PA (US); Lawrence R. Sweeney, Bethel Park, PA (US); Douglas Mark Zatezalo, Allison Park, PA (US)

(73) Assignee: Vocollect, Inc., Pittsburgh, PA (US)

( * ) Notice: Subject to any disclaimer, the term of this patent is extended or adjusted under 35 U.S.C. 154(b) by 519 days.

(21) Appl. No.: 12/785,130

(22) Filed: May 21, 2010

(65) Prior Publication Data
US 2010/0235168 A1 Sep. 16, 2010

Related U.S. Application Data

(63) Continuation of application No. 10/669,070, filed on Sep. 23, 2003, now Pat. No. 7,734,361, which is a continuation-in-part of application No. 10/185,995, filed on Jun. 27, 2002, now abandoned.

(51) Int. Cl.
*G06F 17/00* (2006.01)
*H04R 1/10* (2006.01)

(52) U.S. Cl.
USPC .............................................. 700/94; 381/74

(58) Field of Classification Search
USPC .......................................................... 700/94
See application file for complete search history.

(56) References Cited

U.S. PATENT DOCUMENTS

| | | |
|---|---|---|
| 3,644,687 A | 2/1972 | Richards, Jr. |
| 3,781,492 A | 12/1973 | Dymoke et al. |
| 3,971,901 A | 7/1976 | Foley |
| 4,051,333 A | 9/1977 | Schomburg |
| 4,414,433 A | 11/1983 | Horie et al. |
| 4,727,578 A | 2/1988 | Molnar |
| 4,737,735 A | 4/1988 | Kampes |
| 4,782,524 A | 11/1988 | McQuinn et al. |
| 4,821,329 A | 4/1989 | Straub |
| 4,853,953 A | 8/1989 | Fujisaki |
| 4,918,726 A | 4/1990 | Snyder |
| 4,928,306 A | 5/1990 | Biswas et al. |
| 5,115,463 A | 5/1992 | Moldavsky |
| 5,371,679 A | 12/1994 | Abe et al. |
| 5,402,477 A | 3/1995 | McMahan |
| 5,426,450 A | 6/1995 | Drumm |
| 5,501,571 A | 3/1996 | Van Durrett et al. |
| 5,544,243 A | 8/1996 | Papadopoulos |

(Continued)

FOREIGN PATENT DOCUMENTS

| DE | 202006004625 | 6/2006 |
|---|---|---|
| GB | 2359457 | 8/2001 |

(Continued)

*Primary Examiner* — Joseph Saunders, Jr.
(74) *Attorney, Agent, or Firm* — Wood, Herron & Evans, LLP (57) ABSTRACT

A communication system comprises a terminal configured for being able to communicate with a computer and to operate according to at least one operational parameter. A peripheral device for use with the terminal has a characterizing parameter associated therewith. The terminal is operable for reading the characterizing parameter from the peripheral device when the device is coupled to the terminal. The terminal is further operable for configuring itself to operate according to an operational parameter associated with the characterizing parameter of the peripheral device.

29 Claims, 3 Drawing Sheets

(56) References Cited

U.S. PATENT DOCUMENTS

| | | |
|---|---|---|
| 5,546,488 A | 8/1996 | Kitamura |
| 5,561,710 A | 10/1996 | Helms |
| 5,590,213 A | 12/1996 | Urella et al. |
| 5,604,813 A | 2/1997 | Evans et al. |
| 5,625,684 A | 4/1997 | Matouk et al. |
| 5,698,834 A | 12/1997 | Worthington et al. |
| 5,715,321 A | 2/1998 | Andrea et al. |
| 5,732,143 A | 3/1998 | Andrea et al. |
| 5,757,666 A | 5/1998 | Schreiber et al. |
| 5,764,512 A | 6/1998 | Michel et al. |
| 5,797,102 A | 8/1998 | Hallikainen et al. |
| 5,873,070 A | 2/1999 | Bunte et al. |
| 5,900,867 A | 5/1999 | Schindler et al. |
| 5,905,794 A | 5/1999 | Gunn et al. |
| 5,909,652 A | 6/1999 | Ishikawa et al. |
| 5,978,689 A | 11/1999 | Tuoriniemi et al. |
| 5,995,633 A | 11/1999 | Cappels et al. |
| 6,020,788 A | 2/2000 | Comeau |
| 6,097,943 A | 8/2000 | Nordwall |
| 6,119,084 A | 9/2000 | Roberts et al. |
| 6,126,465 A | 10/2000 | Franks |
| 6,128,384 A | 10/2000 | Papadopoulos et al. |
| 6,226,622 B1 | 5/2001 | Dabbiere |
| 6,237,051 B1 | 5/2001 | Collins |
| 6,310,888 B1 | 10/2001 | Hamlin |
| 6,339,764 B1 | 1/2002 | Livesay et al. |
| 6,466,681 B1 | 10/2002 | Siska, Jr. et al. |
| 6,748,095 B1 | 6/2004 | Goss |
| 6,832,926 B2 | 12/2004 | Rudolph et al. |
| 7,099,481 B2 | 8/2006 | Baker et al. |
| 7,110,800 B2 | 9/2006 | Nagayasu et al. |
| 7,110,839 B2 | 9/2006 | Wood |
| 7,283,635 B1 | 10/2007 | Anderson et al. |
| 7,305,253 B2 | 12/2007 | Snyder et al. |
| 7,327,850 B2 | 2/2008 | Crump et al. |
| 7,356,151 B2 | 4/2008 | Seknicka |
| 7,400,712 B2 | 7/2008 | August |
| 7,408,109 B1 | 8/2008 | Freitas |
| 7,450,726 B2 | 11/2008 | Goyal |
| 7,464,029 B2 | 12/2008 | Visser et al. |
| 7,492,914 B2 | 2/2009 | Arvidsson |
| 7,627,352 B2 | 12/2009 | Gauger, Jr. et al. |
| 7,734,361 B2 | 6/2010 | Murawski et al. |
| 7,761,106 B2 | 7/2010 | Konchitsky |
| 7,869,608 B2 | 1/2011 | Sander et al. |
| 2001/0053228 A1 | 12/2001 | Jones |
| 2002/0111197 A1 | 8/2002 | Fitzgerald |
| 2003/0142814 A1 | 7/2003 | Roy |
| 2004/0254663 A1 | 12/2004 | Dame |
| 2005/0149414 A1 | 7/2005 | Schrodt |
| 2007/0025561 A1 | 2/2007 | Gauger, Jr. et al. |
| 2007/0104333 A1 | 5/2007 | Kuo |
| 2007/0177741 A1 | 8/2007 | Williamson |
| 2008/0157998 A1 | 7/2008 | Zuo et al. |
| 2008/0180874 A1 | 7/2008 | Gauger et al. |
| 2008/0192942 A1 | 8/2008 | Yamkovoy et al. |
| 2009/0022327 A1 | 1/2009 | Buran |
| 2010/0054493 A1 | 3/2010 | Lin et al. |

FOREIGN PATENT DOCUMENTS

| | | |
|---|---|---|
| JP | 2006270583 | 10/2006 |
| KR | 20080079415 | 9/2008 |
| WO | WO2007017810 | 2/2007 |
| WO | WO2007110807 | 10/2007 |

TERMINAL AND METHOD FOR EFFICIENT USE AND IDENTIFICATION OF PERIPHERALS HAVING AUDIO LINES

RELATED APPLICATIONS

This Application is a Continuation of U.S. patent application Ser. No. 10/669,070, filed Sep. 23, 2003, which is a Continuation-In-Part application of U.S. application Ser. No. 10/185,995, filed Jun. 27, 2002, which applications are incorporated by reference herein in their entirety.

FIELD OF THE INVENTION

This invention relates generally to computer terminals and peripherals and more specifically to wearable, mobile and/or portable computer terminals with headsets for use in speech recognition systems.

BACKGROUND OF THE INVENTION

Wearable, mobile and/or portable computer terminals are used for a wide variety of tasks. Such terminals allow workers using them to have mobility, while providing the worker with desirable computing and data-processing functions. Furthermore, various terminals provide a communication link to a larger, more centralized computer system. Such terminals are being implemented for an ever-increasing number of tasks.

One illustrative example of a specific use for a wearable/mobile/portable terminal is inventory management. Computerized inventory management systems are used in inventory-driven industries for various tasks, such as food and retail product distribution, manufacturing, and quality control. An overall integrated management system involves a combination of a central computer system for tracking and management, and the people who use and interface with the computer system in the form of order fillers, pickers and other workers. The workers handle the manual aspects of the integrated system.

To provide an interface between the central computer system and the workers, wearable/mobile computers or terminals are used by the workers as they complete their numerous tasks. Such wearable terminals, for example, pull information directly from the central system and translate the information into voice or text commands for the workers. Through wireless RF networks, the commands to and responses from the workers are communicated between the system and the terminals. To communicate in a voice-driven system, for example, the worker wears a headset which is coupled to his wearable terminal. Through the headset, the workers are able to receive voice instructions, ask questions, report the progress of their tasks, and report working conditions, such as inventory shortages, for example. Using such terminals, the work is done virtually hands-free without equipment to juggle or paperwork to carry around.

In addition to headsets, other peripherals are often coupled to the terminals depending upon the tasks to be performed. For example, bar code readers and other scanners may be utilized alone or in combination with a headset to communicate back and forth with the system.

An illustrative example of a job through a system utilizing wearable and/or portable terminals having voice capabilities may involve initially welcoming the worker to the system and defining a particular task or order, for example, a load to be filled for a certain truck to depart from a warehouse. The worker may then answer with a particular area (e.g., freezer) that they will be working in for that order. The system then vocally directs the worker to a particular aisle and bin to pick a particular quantity of an item. The worker then vocally confirms their location and the amount of items that are picked. The system may then direct them to a loading dock or bay for a particular truck to receive the order. As may be appreciated, various different scenarios might be played out through a system using a wearable terminal and attached peripherals.

In its operation, a wearable terminal utilizes operational software which controls how it performs for the worker or user and how it interfaces with the central system. Such terminal software often has a large set of parameters and features which must be controlled on a per-user basis. Those parameters include, for example, voice templates, user-specific voice models, volume preferences, text-to-text speech preferences, etc. Therefore, each worker who is to wear and use a particular terminal will have to traverse through a series of sometimes complex and cumbersome menu options to select the desired user configuration. Such an exercise is usually error prone and is certainly time consuming and therefore inefficient. Furthermore, when the terminal is used by another worker on a different shift, it will be configured for that worker and will then have to be re-configured for the original worker, assuming that they even get their original terminal back for use.

It is also desirable to ensure that an approved headset is being used. At many sites, the workers are required to maintain their own headsets, and possibly any other personal peripherals. This is done for several reasons. One of those reasons is to encourage careful use and maintenance of the hardware and peripherals by assigning individual responsibility to the worker. Another reason, particularly in the case of the headset, is to promote sanitary hygiene practices.

There is thus a need to improve the efficiency of the workers who utilize wearable and/or portable terminals to interface with a central system. There is further a need to improve customization of peripherals used by specific users. Specifically, it is desirable to reduce the errors and time associated with configuring terminal equipment for each specific worker. It is also desirable to further improve the management, tracking and maintenance of such terminal equipment.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the invention.

DETAILED DESCRIPTION OF EMBODIMENTS OF THE INVENTION

Figure 1:
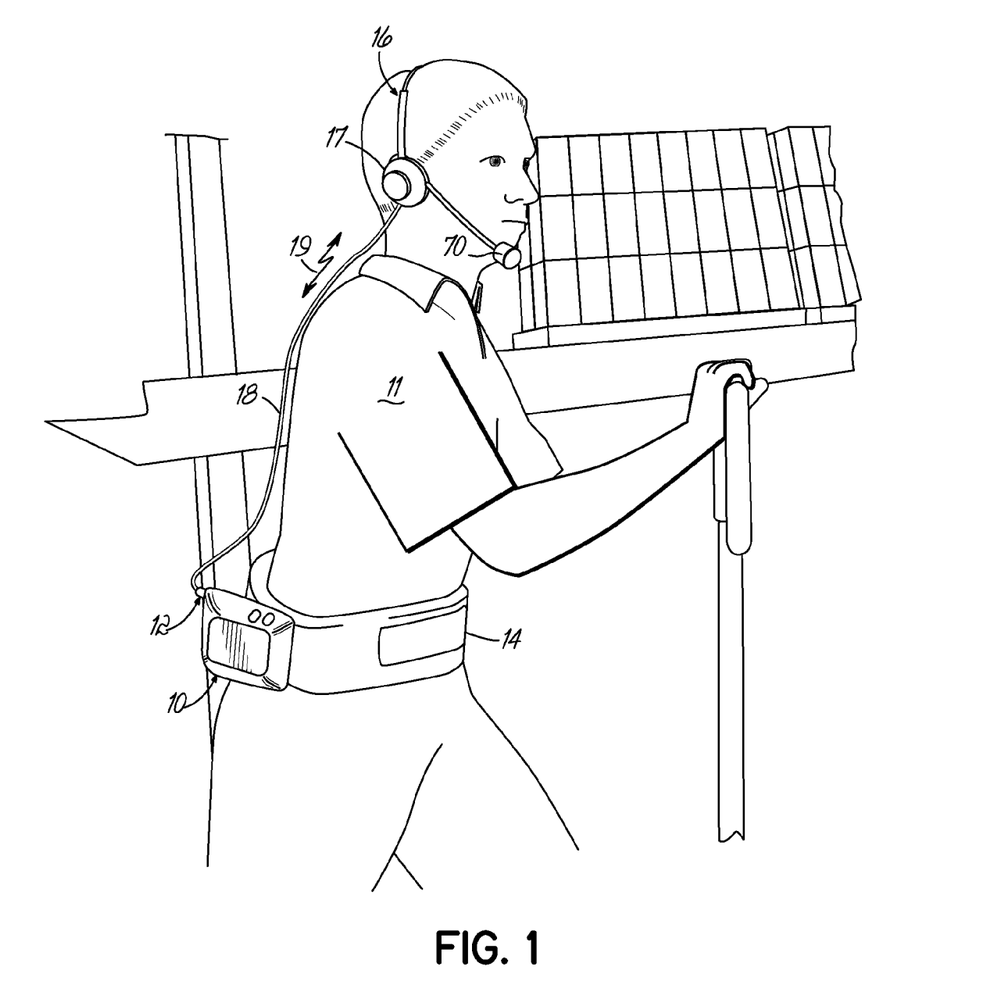
FIG. 1 is a perspective view of a worker using a terminal and peripherals in accordance with the present invention.

Referring to FIG. 1, there is shown, in use, a portable and/or wearable terminal or computer 10 and peripheral device 16 which incorporates an embodiment of the present invention. The portable terminal may be a wearable device, which may be worn by a worker 11, such as on a belt 14 as shown. This allows hands-free use of the terminal. Of course, the terminal might also be manually carried or otherwise transported. The use of the term Aterminal@ herein is not limited and may include any computer, device, machine, or system which is used to perform a specific task, and which is used in conjunction with one or more peripheral devices.

In one exemplary and illustrative use, such portable computer devices or wearable terminals 10 may be used in inventory management and warehouse environments where workers and other users of the terminal are required to: retrieve various items within the warehouse to fill an order, restock shelves, and generally manage and move inventory. Of course, other uses of the terminal, peripherals and invention described herein are contemplated, and the invention is not limited to inventory management systems. The portable terminal 10 permits the worker 11 to communicate with one or more central computers (see FIG. 3) which are part of a larger inventory management system for sending and receiving information regarding the activities and tasks to be performed by the worker. The central computer 90 or computers may run one or more system software packages for inventory and warehouse management.

To provide communication between terminal 10 and a central computer 90 or computers, generally one or more peripheral devices or peripherals, such as a headset 16, are coupled to terminal 10. Headset 16 has an earpiece 17 and microphone 70, and is coupled to the terminal by a cord 18 and plug 12 wireless link 19. The headset 16 is worn on the head of the worker and allows hands-free operation and movement through a warehouse or other facility.

Alternatively, other peripherals might be used with the terminal 10, but are not specifically shown in FIG. 1. For example, a bar code reader might be utilized as well as some other scanner device or a printer. Also, when new workers are acclimated to the system, an audio training device might be assigned to the new worker and utilized with the terminal. Various other suitable devices might also be utilized for providing an interface between the worker 11, the terminal 10, the central computer 90, and the inventory and products being moved and managed. Therefore, the present invention and its applicability is not limited only to a headset or the peripherals described and noted herein and may be used with other peripherals. One suitable terminal for incorporating the invention is the Talkman[7] product available from Vocollect of Pittsburgh, Pa.

As noted above, it may be desirable to assign one or more peripherals to a specific worker to be maintained and kept by that worker, for various reasons, such as personal responsibility and hygiene, to name a few. In accordance with one aspect of the present invention, a characterizing parameter, such as a use, location, user group, user or other characterizing signal, is associated with one or more peripherals and coupled to the terminal, and the characterizing parameter for a peripheral is read by the terminal. Based upon the characterizing parameter, the terminal associates one or more operational parameters with the characterizing parameter for the peripheral and the terminal configures itself and operates according to those parameters. That is, the peripheral automatically or otherwise determines how the terminal is configured to operate. As further discussed herein below, the characterizing parameter might be associated with a chip included in the peripheral, such as in headset 16. Upon reading the code from the chip, the terminal, in one example, configures itself so that it operates in the desired way for the worker who owns and/or uses the specific peripheral or who is associated with that characterizing code or parameter.

In other embodiments, the characterizing parameter might be associated with a bar code or an RF identification or RFID. The characterizing parameter may be associated with a specific worker or user, or a group of users or workers, for example. The characterizing parameter might also be associated with a specific use or a location. The transfer of the characterizing parameter occurs automatically upon coupling the peripheral with the terminal 10 in one embodiment and, therefore, reduces the error and time associated with the worker specifically and manually or otherwise configuring the terminal every time it is used. In that way, it improves the efficiency of the worker and helps to improve upon the management and maintenance of equipment used in warehouse and inventory management tasks.

Figure 2:
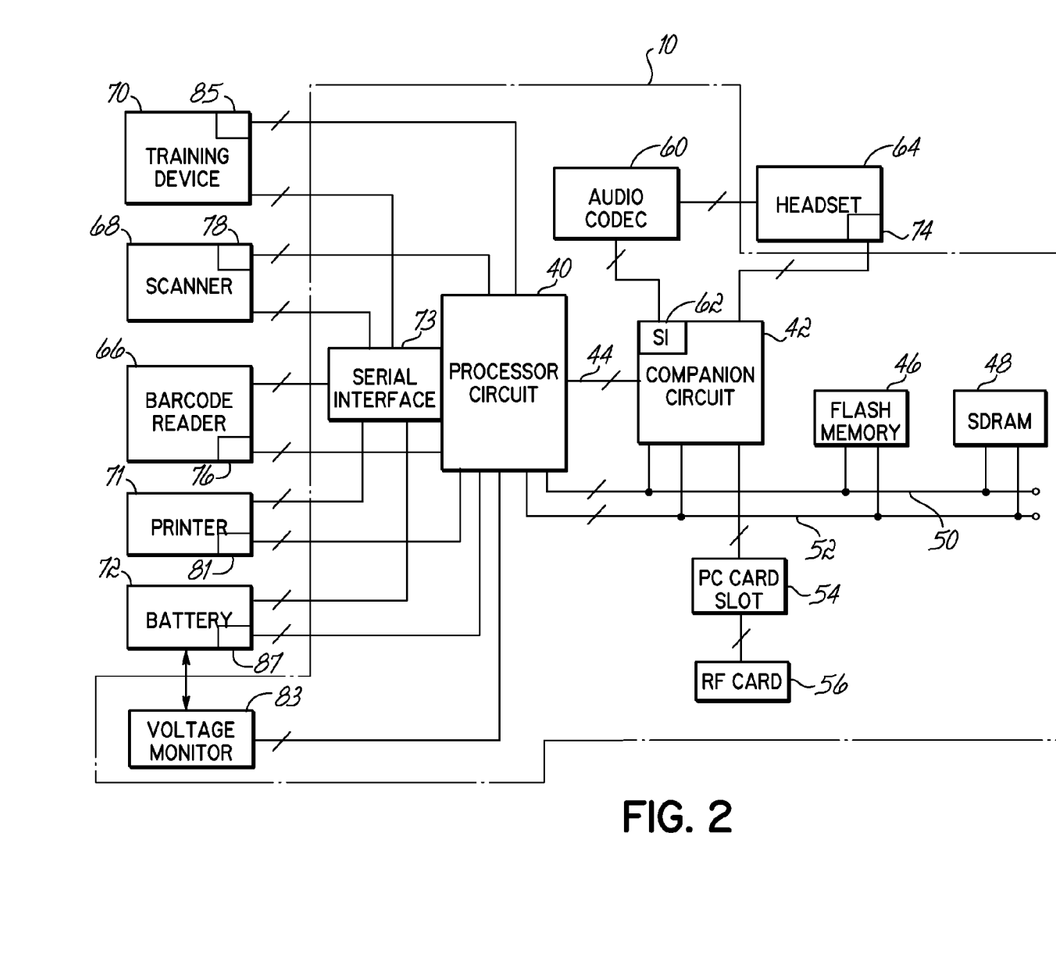
FIG. 2 is a schematic block diagram of an exemplary embodiment of the present invention.

FIG. 2 is a block diagram of one exemplary embodiment utilizing the invention. Specifically, the terminal 10 for communicating with a system, such as an inventory management system, or any other system with which a worker might need to communicate, comprises a processor circuit or processor 40 for controlling the operation of the terminal. As may be appreciated by a person of ordinary skill in the art, such processors operate according to an operating system, which is a software-implemented series of instructions. The processor may also run one or more application programs. In one embodiment of the invention, a processor, such as an Intel SA-1110, might be utilized as the main processor and coupled to a suitable companion circuit or companion chip 42 by appropriate lines 44. One suitable companion circuit might be an SA-1111, also available from Intel. The processor 40, and any companion circuit, are coupled to appropriate memory, such as flash memory 46 and random access memory (SDRAM) 48. For example, a 128 Megabit Strataflash memory component might be utilized for flash memory 46 while one or more 128 Megabit SDRAM chips might be utilized for the random access memory 48. The processor and companion chip 40, 42, are coupled to the memory 46, 48 through appropriate busses, such as 32 bit parallel address bus 50 and data bus 52.

To provide wireless communication between the wearable terminal 10 and central computer 90, the terminal 10 also utilizes a PC card slot 54, so as to provide a wireless ethernet connection, such as an IEEE 802.11 wireless standard. RF communication cards 56 from various vendors might be coupled with the PCMCIA slot 54 to provide communication between terminal 10 and the central computer 90, depending on the hardware required for the wireless RF connection.

In accordance with one aspect of the present invention, a peripheral coupled to terminal 10 might be a headset 16 which provides hands-free voice communication between the worker 11 and the central computer of a warehouse management system. To that end, digital information has to be converted to an audio format, and vice versa, to provide the communication between the system and a worker. For example, in a typical system, the terminal 10 would receive digital instructions from the central computer 90 and will convert those instructions to audio to be heard by a worker 11. The worker 11 will then reply, in a spoken language, and the audio reply will be converted to a useable digital format to be transferred back to the central computer of the system for use in tracking inventory and order filling. It will be appreciated that herein, reference is made to a central computer 90 of a system (see FIG. 3). However, a system might utilize various different computers, and the present invention is not limited to a specific system or computer with which a terminal 10 incorporating the invention may be utilized.

For conversion between digital and analog audio, a CODEC 60 is utilized, and is coupled through an appropriate serial interface 62 to one or both of the processors 40, 42. For example, in the embodiment illustrated in FIG. 2, the audio CODEC 60 is coupled through serial interface 62 to the companion processor 42. One suitable audio circuit, for example, might be a UDA 1341 audio CODEC available from Philips.

Referring to FIG. 2, a peripheral, such as a headset 64, is coupled with the audio CODEC 60 for providing audio input/output, e.g., to the terminal from the worker, and to the worker from the terminal. Other peripherals, such as a bar code reader 66, a scanner 68, a training device 70 or a printer 71 might be coupled to an appropriate serial interface of the terminal 10, and specifically to a serial interface 73 of processor 40. The various peripherals provide a data collecting and communicating interface between the terminal 10, the worker 11, the computer 90 and the overall environment and inventory. That is, the terminal 10 may collect inventory, stocking, and order filling information through a headset, bar code or scanner, and may also provide instructions through those various peripherals and/or through a printer. The training device 70 might be utilized with a new worker to coach them through training the terminal and the system with their voice commands.

In accordance with one aspect of the present invention, a peripheral 64, 66, 68, 70, 71 has a defined characterizing parameter associated therewith to be read by the terminal circuitry, such as processors 40, 42, and utilized to define the operation of the terminal 10. Specifically, the processors 40, 42 control the operation of the terminal, such as through the execution of the operating system and application programs. The operating system software and application software utilized by the terminal, such as application/operating software stored in the processor memory or in separate memory 46, 48, is utilized to define various operational parameters for the terminal. For example, the volume on the terminal may be adjusted up or down to help the worker 11 communicate, such as in a noisy environment. Furthermore, voice templates may be utilized for each specific user. Voice templates provide a fingerprint of the user=s voice to be recognized by the terminal. Still further, text-to-speech preferences may be an operational parameter for the terminal for providing the necessary terminal settings which address the pitch, speed, gender, etc. of the voice commands through the terminal. Still other operational parameters for the terminal and for specific peripherals are defined by the terminal and may be implemented and adjusted by a worker.

As noted above, such operational parameters for configuring the terminal may be associated with a menu through which a worker will progress. Generally, the terminal will include input/output devices, such as buttons, screens, cursors, readouts, etc., for allowing a worker to access a menu and program their specific terminal for the desirable settings and operational parameters which they would like to use. Traditionally, a worker has had to progress through a series of complex and cumbersome menu options to select the proper configuration and operational parameters. Such manual manipulation is error prone and time consuming.

As used herein, the term Aoperational parameters@ is used to refer to the various different configurations, settings, parameters, menus, preferences, selections, etc. under which or by which the terminal may operate. Certain of the operational parameters may be those traditionally selectable by a worker through menus. However, other such operational parameters which might be associated with a characterizing parameter of the invention, might be only selectable upon use of a certain peripheral.

In one aspect of the present invention, the peripherals include defined characterizing parameters which may be read or otherwise determined by one or more of the processor components 40, 42, when a peripheral is coupled to the terminal. In one embodiment, such a determination of the characterizing parameter is made automatically upon coupling the peripheral to the terminal. Alternatively, a worker might be prompted to initiate such a determination when the peripheral and terminal are coupled. The processor or other terminal circuitry is further operable for associating a desired operational parameter, or multiple operational parameters, with the characterizing parameter of the peripheral and then configuring the terminal to operate according to those associated operational parameters. That is, the processor circuits 40, 42 will configure the terminal with the desired settings, configurations and other operational parameters that are desired by or associated with the worker by the coupling of a peripheral to the terminal. In that sense, the characterizing parameter is associated with the user and the user=s preferences or the specific preferences that might be assigned to the user. In a general sense, the use characterizing parameter is associated with how and/or by whom the terminal is to be used. As discussed below, such criteria may be defined by or associated with a specific user, a group of users or a location or area of a facility, for example. Therefore, whenever a user couples his peripheral to terminal 10, that terminal will reconfigure itself so that it operates according to the way that the specific user desires or according to the way that the terminal should be configured based on other user criteria, as discussed below. Subsequently, if another worker utilizes the same terminal and plugs a specific peripheral into the terminal, the terminal will again reconfigure itself based upon the use characterizing parameters and user criteria defined by the specific peripheral coupled thereto. As such, the present invention avoids the cumbersome and time consuming task of requiring each new user to manually travel through the complex menu options to configure the terminal as desired. Rather, based upon an initial configuration and associated operational parameters that are stored and associated with respect to a characterizing parameter, the desired configuration is achieved automatically by coupling a peripheral with the terminal.

In one embodiment of the invention, as discussed herein, a characterizing parameter for a peripheral is associated with user criteria for a specific worker or user. In that way, upon reading the characterizing parameter of the peripheral, the terminal is configured based upon that specific user=s criteria and personal preferences. Alternatively, the terminal might be configured, not according to a specific user=s criteria or personal preferences, but according to associated user criteria selected by the system. That is, all the peripherals for a group of users which may be working in a certain area or section of a facility may require that the terminals be configured generally with the same user criteria for the user group and with the associated desired operational parameters, but not necessarily the operational parameters and criteria desired by an individual user. In that way, parameters might be associated with the criteria for a group of users rather than individuals. The group might be defined by various user criteria, such as their location and/or a job within a warehouse or other facility.

In another embodiment, the terminal might be configured based on a specific use of the terminal and not on the preferences of a user.

Alternatively, a peripheral might not be assigned to one or more individual users, but rather might be associated with a particular area in the warehouse or some other particular criteria. That is, the user criteria is location specific. When a terminal is utilized with such a peripheral and the terminal reads the characterizing parameter of the peripheral, the terminal will be configured for that specific facility area or for the specific user criteria associated with the characterizing parameter. Therefore, the characterizing parameter aspect of the present invention might be associated with a specific use, with user criteria for an individual worker and their individual preferences, with a group of workers and their individual or selective preferences for the group, with the location of the terminals or some other group or subset criteria, such that the terminals will be readily and/or automatically configured when specific peripherals having characterizing parameters are coupled thereto.

In one embodiment of the invention, the characterizing parameter for a peripheral is defined by a device or component, such as a chip. Upon coupling the peripheral to the terminal, the processor or processors 40, 42 read the individual code of the chip, which defines its characterizing parameter. One or more operational parameters are associated with that specific peripheral code and associated characterizing parameter and the user or other criteria associated with the characterizing parameter. The association of the operation parameter with the characterizing parameter may be achieved in various different ways. For example, utilizing the characterizing parameter which is received or read from the peripheral, a look-up table might provide the desired operational parameters for reconfiguring the terminal according to specific criteria. As such, the terminal may have stored in memory the operational parameters associated with a number of characterizing parameters and specific peripherals corresponding to the workers who might use the terminal or other location. To that end, when the terminal is originally configured with a peripheral plugged into or coupled with the terminal, the original parameters might be saved and stored based on the characterizing parameter, and thereby associated with the characterizing parameter of the peripheral. Alternatively, the operational parameters might be stored in one or more central computers associated with the system, and may be downloaded to the terminal upon the terminal communicating with those computers. In that way, the characterizing parameter of the peripheral is read by the terminal and is passed through the terminal to the system computers wherein the desired configuration or operational parameters are retrieved that are associated with that characterizing parameter.

Referring again to FIG. 2, a headset 64 is shown having a characterizing or configuring chip or component 74 therein or associated therewith. As discussed below, the component 74 might also represent a device that interfaces with the terminal to provide characterizing parameters. In the scenario of a chip, dedicated lines 75 couple the chip to processor 42 so that the code of the headset 64 (i.e., characterizing parameter) may be read. When the headset 64, and particularly the cord 18 associated with the headset, is coupled to terminal 10, the processor 42 reads the use characterizing code or parameter associated with the headset. Based upon the characterizing parameter, the processor circuits 40, 42 progress through the selectable features of the system for configuring the terminal into the configuration associated with the characterizing parameters, such as that desired by the particular worker who owns the headset 64 or other peripheral, for example. The various operational parameters associated with the characterizing parameter might be retrieved from memory 46, 48 or other memory.

Similarly, a bar code reader 66 also includes a chip 76 or other component that defines the characterizing parameter for that peripheral. Upon coupling the peripheral, through a serial interface 62, 73 to one of the processors 40, 42, the characterizing parameter is read by the terminal, such as by the processor(s), and the processor(s) are further operable for associating one or more operational parameters with the characterizing parameter of the peripheral. Generally, the operational parameters for configuration of the terminal for the bar code reader will be different from the operational parameters for configuration of the terminal for the headset. That is, the terminal 10 handles multiple different sets of operational parameters and will select them based upon the peripheral which is coupled thereto. Different peripherals have different operational parameters or sets of operational parameters. For example, a bar code reader 66, which does not generally interface between the central computer and the worker with voice commands, will not require configuration of voice parameters as would a headset 64.

Other peripherals may be utilized, and the present invention is not limited to the exemplary embodiments disclosed herein. For example, a scanner 68 includes a chip or component 78 that defines its characterizing parameter. Upon coupling the scanner to processor 40 through a serial interface 73, the characterizing parameter is determined and associated with one or more operational parameters for the scanner 68. Likewise, a training device 70 with a chip or component 85 is coupled to the processor 40 which reads the chip 85 for the training device 70 and adjusts the configuration of the terminal and its operation accordingly. Still further, a printer 71 with chip or component 81 might also be coupled to processor 40. In that way, the present invention may handle multiple peripherals at one time and can provide the desired operational parameters and operational configuration for each of those peripherals without requiring the worker to slowly go through each available menu for a peripheral. This results in significant time savings and eliminates errors associated with such programming. A worker will not usually require that all available peripherals be associated with the terminal at once.

In another embodiment of the invention, peripherals such as bar code reader 66, or scanner 68, might define a characterizing parameter and an operational parameter for the terminal by reading or scanning a particular code, and then transferring that to the terminal through their respective components 76, 78. For example, a bar code reader might read a bar code that would then be transferred to the terminal to tell the terminal how to configure itself.

In another embodiment of the invention, the component, such as component 74, utilized by a peripheral such as a headset 64, might be an RF identification, or RFID wherein the headset 10 would then have the capability, such as an RF reader incorporated into the processing circuitry of the headset to read the RFID. In that way, a dedicated line would not be necessary for transferring a characterizing parameter to the terminal 10. Rather, such interfacing would be automatic when the peripheral and the terminal are brought into proximity with each other.

The present invention allows any number of peripherals to be associated with a user, a particular use, a location, a group of users, etc., and then to configure a specific terminal as desired to adapt to one of those Apeople groups@ or other criteria.

Figure 3:
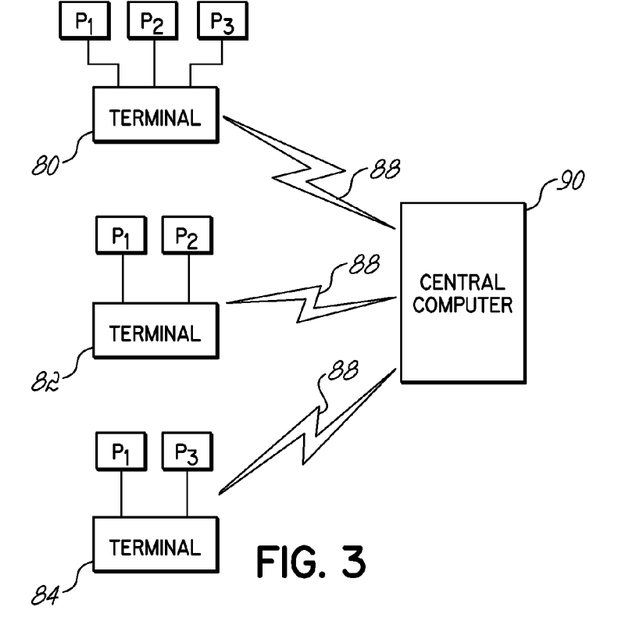
FIG. 3 is a schematic block diagram of a system incorporating the present invention.

In another aspect of the present invention, the various peripherals and their location may be tracked based upon the characterizing parameter associated with each of the peripherals. Referring to FIG. 3, each of the various terminals 80, 82 and 84 interface with one or more central computers 90, such as through wireless communication signals 88. Associated with the terminals might be various peripherals $P_1$, $P_2$, $P_3$. Upon coupling one or more of the peripherals to a terminal 80-84, the specific characterizing parameter associated with the peripheral may be forwarded to central computer 90. The central computer 90 is then operable for tracking the existence and use of the peripheral within the system, and its specific location as associated with a terminal 80-84. The central computer 86 may then provide inventory control for the peripherals, such as for maintenance purposes, to reduce theft, and for efficient use of the peripheral resources. For example, one worker may have a bar code reader, but may be located in a particular area of the warehouse that may be filling an order which does not require a bar code reader. In that way, the central computer might be utilized to direct another worker to the location of the bar code reader if they need it. Alternatively, the central computer might be utilized to communicate to the worker who has the bar code reader that someone else needs it. As discussed herein, the term characterizing parameter is utilized to generally designate the identification information provided to a terminal or computer by a chip or other component or device, and associated with a specific peripheral. In the present invention, the name of a worker might be associated with a terminal they are using. Therefore the worker is associated with the various peripherals coupled to the terminal based on the characterizing parameters read by the terminal and transferred to the central computer. In that way, the characterizing parameters of the various peripherals might be utilized to instruct the workers, by name, to pass peripherals back and forth to each other, as they are needed.

In accordance with another aspect of the present invention, power sources such as batteries 72 also have specific characterizing parameters 87 which are read by the terminal, specifically a terminal processor circuits 40, 42. The operational parameters of the terminal associated with power may then be configured as desired for the specific battery plugged into the terminal and associated with the characterizing parameter that is read. That is, whenever a specific battery is attached to the terminal, the operational software of the terminal may automatically adjust. In one embodiment, it is anticipated that the association of operational parameters with a characterizing parameter will occur automatically upon coupling a peripheral with a terminal. However, as a further step, it might be required that the worker actually requests such reconfiguration based upon one or more simple inputs. That is, the new configuration would not occur automatically.

With respect to battery performance and battery management, the operational software of the terminal or the central computer could track a history of battery performance for each battery which is used with the terminal. The terminal software could adapt its voltage/time characteristic curve for detecting a low battery situation in order to notify the worker that a new battery will be required. Furthermore, utilizing the characterizing parameter associated with a battery, further operational characteristics, rather than just low battery voltage monitoring, may be achieved. For example, in one embodiment, the software will monitor the life of a battery between its fully charged state and the low battery state using voltage monitor 83 (FIG. 2). As batteries deteriorate, one symptom is that they do not hold a sufficient charge as long and thus are depleted more rapidly (shorter life). With the present invention, such an occurrence may be detected so that a battery (defined by its characterizing parameter) may be taken completely out of circulation and disposed of, rather than having it go through additional wasteful re-charge cycles. Again, as noted above with respect to FIG. 3, not only might the terminal notify a worker wearing the specific terminal, but also central computer 90 might receive such information as well so that all the batteries used within the system might be monitored for replacement and re-charging.

The present invention provides various advantages, as noted above, and is particularly useful when utilized with a computer or terminal that incorporates speech recognition. It is desirable that the terminal be able to identify a peripheral such as a headset or a microphone that is being used to enter the speech. For example, potential benefits provided by the invention with respect to headset peripherals and speech recognition, include identifying the user, identifying the type of headset used, and ensuring that an appropriate approved headset is being utilized with the terminal. Such information may be used to characterize the use of the terminal and to configure it for a specific headset or user, or a specific group of users or location. Specifically, when the user is identified, user-specific voice modules can be loaded automatically. Alternatively, generic voice models can be adapted to a specific user. When the type of headset is identified, speech recognizer algorithms may be modified accordingly. Additionally, the use characterizing codes or signals provided by the headset may be used to ensure that the headset is approved for use with the specific terminal.

In accordance with another embodiment of the invention specifically directed to a peripheral that provides audio signals, such as a headset, the peripheral is operable to forward a characterizing signal such as an I.D. code, or other code, on the dedicated and existing lines used for audio signals, rather than requiring a separate data line to a processor for such information. Therefore, such an embodiment of the invention may be utilized for any terminal that utilizes a headset connector and does not require a dedicated data line.

Figure 4:
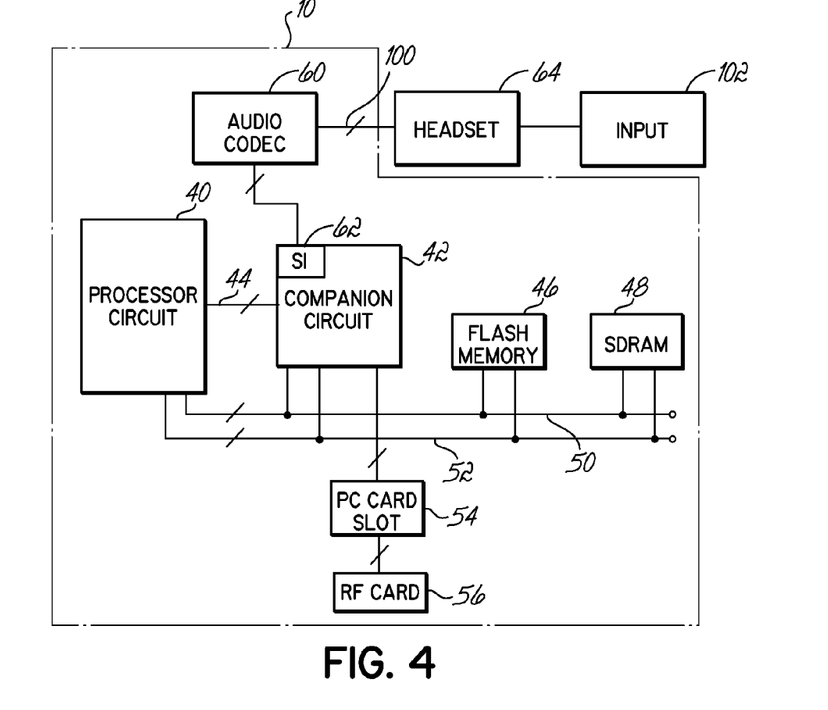
FIG. 4 is a schematic block diagram of another embodiment of the present invention.

Specifically referring to FIG. 4, a terminal 10 and a peripheral 64 are shown coupled together in accordance with the principles of the present invention. The peripheral 64 is indicated as a headset, although other peripherals that may already have existing audio lines or other lines for sending signals, such as audio signals, to the terminal may also be utilized in accordance with the invention.

Referring to FIG. 4, the peripheral 64, such as a headset, utilizes one or more lines 100 for directing audio signals between the terminal 10 and the headset 64. These audio signals are usually the voice or speech signals between the headset and the terminal/central computer for the user. Specifically, when the user speaks, the microphone of the headset captures the speech and forwards it to the terminal/central computer, and vice versa for computer generated commands. In accordance with one aspect of the invention, in response to some trigger event, the peripheral such as headset 64, is operable to forward a characterizing signal on one or more of the audio lines 100. The terminal then associates an operational parameter for the terminal with the characterizing signal of the peripheral device, as discussed above. For example, the characterizing signal might be an identification, or I.D. signal of some kind. The characterizing signal will have useful information therein for use by the terminal. The operational parameters associated with operation of the terminal and associated with the use characterizing I.D. signal may include various different parameters, such as those related to user-specific voice models or generic voice models, or a modification of speech recognizer algorithms for a specific headset.

In accordance with the invention, the embodiment illustrated in FIG. 4 eliminates the need for separate data lines like lines 75 between the peripheral and the terminal. Rather, the peripheral, such as headset 64, uses lines 100 for passing both voice information and the characterizing signal, such as an I.D. signal. As such, the invention is usable with a wide range of terminals which do not have dedicated data inputs.

To that end, in one embodiment of the invention, the lines 100 may represent the audio lines from a microphone of the headset. The headset incorporate appropriate circuitry for generating the characterizing signal, and the terminal 10 utilizes circuitry that is operable for processing the characterizing signal. In one example, the characterizing signal, or I.D. signal, may be an audio signal. To that end, the headset may include a sound generating chip, such as a DTMF tone generator, as is used in telephones. The output of the sound generating chip in the headset is appropriately connected to the headset microphone line 100 in such a way that the headset can Abeep@ a serial number, I.D., or some other Ause characterizing@ signal down the microphone line to be received by the terminal 10. The terminal then utilizes frequency analysis circuitry and any other appropriate frequency analysis techniques for processing the I.D. signal or other characterizing signal from the headset. For example, in one embodiment, speech recognition software that may reside in the processor circuit 40 or the companion circuit 42, may be configured for decoding the serial number or the I.D. number. The I.D. may be associated with a specific user or headset owner, or a group of users or a location or some other criteria. The terminal may then load specific voice patterns associated with the owner of the headset. Alternatively, the terminal may be configured some other way for the specific headset or the specific user.

In an alternative embodiment of the invention, a non-tone or non-audio signal, such as a PWM stream, or pulse width modulation stream may be utilized. The processing circuitry of the terminal would then be configured to decode the PWM stream. In such a case, the processing circuitry for decoding or reading the characterizing signal may be simplified.

In accordance with another aspect of the present invention, the signal may be sent from the headset to the terminal based upon a specific trigger event. In one embodiment, the headset 64 may be configured to automatically forward the signal to the terminal when it is coupled to the terminal, such as when the microphone line is plugged into the socket in the terminal. Alternatively, the trigger event might be when the terminal 10 or other computer powers up. To that end, the signal generating circuitry of the headset could potentially be powered using the microphone bias current that is typically supplied by the terminal on lines 100. In such a case, a capacitor, such as an ultra-capacitor might be utilized to manage the temporary current surge when the headset is beeping. Alternatively, a long life battery might be utilized for powering the appropriate circuitry to generate the signal from the headset to the terminal. In one embodiment, the headset might generate an I.D. signal in response to detecting bias voltage on the microphone line 100. Alternatively, the headset may have an input 102, such as a button. When the user presses the button, the headset sends the signal on lines 100.

As noted above, various operational parameters might be stored in memory, and/or be selected from a group of various parameters based on the characterizing signal.

In another aspect of the present invention, it may be desirable to configure the operational parameters and the software terminal based upon a system selected preference, rather than that desired by a particular worker. That is, it may be desirable for consistency within the system to insure that, for certain peripherals, each of the terminals will operate the same. The present invention, utilizing an characterizing parameter associated with each peripheral, such as through a chip or other component, will allow the central computer 90 to control the various terminals 80, 82 and 84 as they are configured based upon the system user preference or criteria, rather than a specific user preference or criteria.

Although exemplary embodiments are discussed with a single code, a peripheral might include multiple use characterizing codes which are used to define multiple characterizing parameters. Such multiple parameters could then be used for accessing or implementing multiple sets of operational parameters. Therefore, the present invention may be tailored to provide the desired association of one or more sets of operational parameters with a specific peripheral to configure the terminal.

Therefore, the present invention improves the efficiency of the workers and their interface with a central system and reduces the error and time associated with configuring specific terminal equipment for a worker, based upon the peripherals used by that worker. Furthermore, the management, tracking and maintenance of equipment, such as peripherals, within a system is improved. And still further, consistency throughout the system may be improved.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant=s general inventive concept.

What is claimed is:

1. An apparatus for speech recognition comprising:
    a computer device having bi-directional speech capabilities including a speech recognition functionality operable for processing audio signals to convert user speech to a digital format for speech recognition in accordance with one or more speech recognizer algorithms and including a text-to-speech functionality for converting data in a digital format into audio signals;
    a headset for coupling to the computer device and having at least one line for coupling the headset to the computer device, the headset providing at least one characterizing signal in the form of a non-speech data signal that is associated with the headset, the at least one characterizing signal being associated with one or more operational parameters for the computer device, including speech recognizer algorithms;
    the headset configured to forward the characterizing signal on the at least one line to the computer device;
    the computer device operable for receiving the characterizing signal and for configuring the speech recognition functionality of the computer device by selecting a speech recognizer algorithm based upon the characterizing signal, the speech recognizer algorithm used for recognizing user speech.

2. The apparatus of claim 1 wherein the computer device is further operable for configuring the computer device according to another operational parameter for the computer device that is associated with the characterizing signal of the headset.

3. The apparatus of claim 1 wherein the characterizing signal is associated with at least one of a specific use, a specific user, a specific use group and a specific location.

4. The apparatus of claim 1 wherein the characterizing signal is reflective of an ID of the headset.

5. The apparatus of claim 1 wherein the characterizing signal is an audio signal and the at least one line includes a line for handling audio signals in the headset.

6. The apparatus of claim 1 wherein the computer device includes memory for storing the one or more speech recognizer algorithms, the computer device selecting a stored speech recognizer algorithm based on the characterizing signal.

7. The apparatus of claim 1 wherein the characterizing signal is one of a DTMF tone and a PWM stream.

8. The apparatus of claim 1 wherein headset has at least one microphone and a microphone line, the characterizing signal being forwarded on the microphone line.

9. The apparatus of claim 1 wherein the headset includes a tone generator for generating audio tones to form the characterizing signal.

10. The apparatus of claim 1 wherein the headset is configured to automatically forward the characterizing signal to the computer device when it is coupled to the computer device.

11. The apparatus of claim 1 wherein the headset has an input, the headset forwarding the characterizing signal to the computer device when the input is engaged.

12. The apparatus of claim 1 wherein the headset includes circuitry for generating the characterizing signal, the circuitry being powered by the computer device on the at least one line for coupling the headset to the computer device.

13. The apparatus of claim 1 wherein the operational parameters are in a menu, the computer device operable for accessing the menu based upon the characterizing signal.

14. The apparatus of claim 1 wherein said computer device is configured for coupling with the headset and additional peripheral devices, the computer device being configurable to operate according to operational parameters associated with the characterizing signals of the additional peripheral devices.

15. The apparatus of claim 1 wherein the characterizing signal of the headset reflects a type of headset, the speech recognizer algorithm being selected based upon the type of headset.

16. The apparatus of claim 1 wherein the characterizing signal of the headset reflects a type of headset and is also used by the computer device to ensure that the headset is approved for use with the computer device.

17. A headset for use with a computer device having bi-directional speech capabilities including a speech recognition functionality operable for processing audio signals to convert user speech to a digital format for speech recognition in accordance with one or more speech recognizer algorithms and including a text-to-speech functionality for converting data in a digital format into audio signals, the headset comprising:
   a speaker for capturing audio signals;
   at least one line for coupling the headset to a computer device;
   circuitry for generating at least one characterizing signal in the form of a non-speech data signal that is associated with the headset, the characterizing signal being associated with one or more operational parameters for the computer device and being indicative of the speech recognizer algorithm that is to be used for the headset by the coupled computer device;
   the headset configured to forward the characterizing signal on the at least one line to the computer device so the computer device can use the characterizing signal to select a speech recognizer algorithm for the headset to be used by the computer device for recognizing user speech.

18. The headset of claim 17 wherein the characterizing signal is also associated with another operational parameter for the computer device.

19. The headset of claim 17 wherein the characterizing signal is associated with at least one of a specific use, a specific user, a specific use group and a specific location.

20. The headset of claim 17 wherein the characterizing signal is reflective of an ID of the headset.

21. The headset of claim 17 wherein the characterizing signal is an audio signal and the at least one line includes a line for handling audio signals in the headset.

22. The headset of claim 17 wherein the characterizing signal is further indicative of a type of headset so that the computer device can select a speech recognizer algorithm based upon the type of headset.

23. The headset of claim 17 wherein the characterizing signal is one of a DTMF tone and a PWM stream.

24. The headset of claim 17 wherein headset has at least one microphone and a microphone line, the characterizing signal being forwarded on the microphone line.

25. The headset of claim 17 wherein the headset includes a tone generator for generating audio tones to form the characterizing signal.

26. The headset of claim 17 wherein the headset is configured to automatically forward the characterizing signal to the computer device when it is coupled to the computer device.

27. The headset of claim 17 wherein the headset has an input, the headset forwarding the characterizing signal to the computer device when the input is engaged.

28. The headset of claim 17 wherein the headset includes circuitry for generating the characterizing signal, the circuitry configured for being powered by a computer device on the at least one line for coupling the headset to the computer device.

29. The headset of claim 17 wherein the characterizing signal of the headset reflects a type of headset and is also used by the computer device to ensure that the headset is approved for use with the computer device.

* * * * *